United States Patent
Miller

(10) Patent No.: US 7,396,553 B2
(45) Date of Patent: Jul. 8, 2008

(54) METHOD OF MANUFACTURING CONDENSED MILK

(76) Inventor: Van Miller, P.O. Box 100, Norval, Ontario (CA) L0P 1A0

(*) Notice: Subject to any disclaimer, the term of this patent is extended or adjusted under 35 U.S.C. 154(b) by 738 days.

(21) Appl. No.: 10/623,547

(22) Filed: Jul. 22, 2003

(65) Prior Publication Data
US 2005/0019473 A1    Jan. 27, 2005

(51) Int. Cl.
*A23C 3/02* (2006.01)
*A23C 3/04* (2006.01)
*A23C 9/00* (2006.01)

(52) U.S. Cl. .................. 426/587; 426/522; 426/588

(58) Field of Classification Search ................ 426/580, 426/587, 588, 130, 522, 656
See application file for complete search history.

(56) References Cited

U.S. PATENT DOCUMENTS

| | | | | |
|---|---|---|---|---|
| 1,449,688 A | * | 3/1923 | Mojonnier | 426/587 |
| 1,626,818 A | * | 5/1927 | Hatmaker | 426/587 |
| 3,643,586 A | * | 2/1972 | Robinson | 53/510 |
| 4,362,756 A | | 12/1982 | Williams | |
| 4,948,616 A | | 8/1990 | Iijima et al. | |
| 5,229,159 A | | 7/1993 | Schwan | |
| 2002/0098273 A1 | | 7/2002 | Wyss et al. | |

OTHER PUBLICATIONS

Food and Drug Administration—21 CFR 131.110 and 131.120.*
MooMilk- FAQ—http://web.archive.org/web/20020204124624/http://moomilk.com/faq.htm.*

* cited by examiner

*Primary Examiner*—Arthur L Corbin
(74) *Attorney, Agent, or Firm*—Gowan Intellectual Property

(57) ABSTRACT

A method of manufacturing condensed milk having a milk solids component of 32% to 40% by weight comprises the steps of mixing liquid milk having 10% to 14% milk solids and a first predetermined milk fat content with dried milk powder having a second predetermined milk fat content, in appropriate amounts so that the total weight percentage of milk solids in the mixture, from the liquid milk and from the dried milk powder, is 32% to 40% by weight of the mixture. Then, the mixture is permitted to stand for at least 30 minutes; after which it is pasteurized and recovered for further packaging and handling. Typically, the storage, mixing, and standing steps are carried out at temperatures of 2° C. to 25° C., and preferably below 10° C.

11 Claims, No Drawings

METHOD OF MANUFACTURING CONDENSED MILK

FIELD OF THE INVENTION

This invention relates to condensed milk, and particularly the invention relates to manufactured condensed milk which is made from a whole milk component and from a dried milk powder component. In other words, the present invention relates to manufactured condensed milk which has no non-milk additives, except milk-compatible sweeteners as may be required or desired.

BACKGROUND OF THE INVENTION

There is a continuing and growing demand for condensed milk—sometimes referred to as evaporated milk—whether or not that milk is sweetened, and whether or not the condensed milk has zero, low, or ordinary milk fat content. In other words, the condensed milk may be required to have 0% fat content, 2% milk fat content, or a milk fat content in the range of 4.5% to 6%. However, the costs of preparation of condensed milk maybe high, especially if large quantities of condensed milk are to be manufactured.

The ordinary milk solids content of liquid milk is typically about 12% by weight thereof. That may range slightly from, say, 11.5% to 12.5%, but nominally regular liquid milk is considered to have 12% milk solids. Condensed milk, as it is brought to the market, typically has 36% milk solids, by weight. In other words, ordinary milk has been condensed or reduced as to its liquid content by two thirds of its original liquid content. However, typically condensed milk has a different color than ordinary milk, and has a slightly caramelized flavor, as a consequence of the evaporation process to which the milk has been subjected.

There is a requirement to provide condensed milk which has less pronounced color and flavor than is presently available. One attempt to make such provision of condensed milk has been the simple act of mixing dried milk powder—in other words, milk solids—with water. The idea has been to make a mixture of dried milk powder and water which, when mixed, comprises 36% milk solids. However, typically such attempts have failed because milk lactose and milk protein are not very soluble in ordinary water, as it has been obtained from ordinary sources of water such as municipal water supplies or the like, and whether or not it has been treated by special filtering, deionizing, pH adjustment, and so on.

This is not to say, of course, that milk lactose and milk protein are not soluble in water, because very evidently they are as they are found in milk which has been taken from dairy cattle. In other words, the water processing and production of milk that naturally occur within the bovine system provide water that is fully completely compatible with all milk solids, lactose, protein, etc.

Notwithstanding the above statement, the inventor herein has quite unexpectedly discovered that a satisfactory condensed milk product having approximately 36% milk solids and a desired milk fat component maybe manufactured by mixing dried milk powder with liquid milk, which may be either raw milk or which may have been previously pasteurized. That is, manufactured condensed milk is provided which has not been subjected to heat processing except for pasteurization. As a consequence, the manufactured condensed milk of the present invention has a differing flavor and color than ordinary condensed milk. It will be understood, however, that manufactured condensed milk in keeping with the present invention may be altered in its flavor by being slightly sweetened and/or caramelized.

Specifically, the inventor herein has discovered that condensed milk may be manufactured to meet the requirements of the market at relatively low cost compared with the cost of ordinary preparation of condensed milk, wherein the condensed milk has the requisite milk solids content and may have a predetermined milk fat content as required. This is accomplished by recognizing the natural affinity of the water content in milk which has been derived from dairy cattle—i.e., bovine-derived water—for lactose and milk proteins. In other words, the solubility of lactose and milk proteins in bovine-derived water is assured.

A particular feature of the condensed milk which is manufactured in keeping with the present invention is that it does not comprise non-milk additives, and therefore the condensed milk in keeping with the present invention is not considered to be a condensed or evaporated milk substitute.

DESCRIPTION OF THE PRIOR ART

Williams U.S. Pat. No. 4,362,756 teaches a brown sugar sweetened condensed milk having a composition which has 28% milk solids. The purpose of the invention which is described in that patent is to avoid casein precipitation as it would normally occur in a conventional process for preparing sweetened condensed milk.

Iijima et al. provide another sweetened condensed milk composition whose purpose is to have equivalent physical properties and storage properties as a sweetened condensed milk containing sucrose, but which reduces the likelihood of tooth decay when employed in candy formulations. The sweetened condensed milk composition particularly comprises palatinose and palatinose syrups; and may have varying fat composition.

Schwan U.S. Pat. No. 5,229,159 teaches a method for preparation of evaporated milk by which a standardized milk is separated into first and second fluxes, with the first flux being homogenized and then mixed with the unhomogenized second flux. The mixture is then heat treated and then concentrated and sterilized.

Wyss et al. United States Patent Application Publication 2002/0098273 teaches a process for manufacturing an evaporated milk product from a whey product, where the whey may optionally be partially substituted with lactose. Here, the whey is first made into an aqueous solution and then added to fresh whole milk. Thereafter, the mixture is concentrated by evaporation.

SUMMARY OF THE INVENTION

The present invention provides a method of manufacturing condensed milk having a milk solids component of 32% to 40% by weight thereof, and having a predetermined milk fat content, by following the steps of:

(a) Mixing liquid milk which has 10% to 14% milk solids and a first predetermined milk fat content with dried milk powder having a second predetermined milk fat content, in amounts so that the total weight percentage of milk solids from the liquid milk and the dried milk powder is 32% to 40% by weight of the mixture.

(b) Permitting the mixture of step (a) to stand for at least 30 minutes.

(c) Pasteurizing the mixture after the conclusion of step (b).

(d) Recovering the pasteurized mixture for further packaging and handling.

In general, the liquid milk which is employed for purposes of the present invention is raw milk, pasteurized milk, and mixtures thereof.

Typically, the liquid milk has been stored at a temperature of 2° C. to 25° C., and preferably less than 10° C.; and steps (a) and (b) are carried out at that same temperature, preferably at or below 10° C.

The period for which the mixture is permitted to stand in step (b) is typically from 45 minutes to 3 hours.

Moreover, it may be necessary that the mixture should be stirred occasionally, while it is standing.

The liquid milk may have a fat content of from 0 to 6% by weight, and also the milk powder may have been derived from liquid milk having a milk content of from 0 to 6% by weight.

The first and second predetermined milk fat contents of liquid milk and milk powder, respectively, may be such that the milk fat content of the mixture—and therefore of the manufactured condensed milk following completion of the process of manufacture thereof—may be 0%, 2%, or in the range of 4.5% to 6%.

Typically, the liquid milk has a milk solids content of from 11.5% to 12.5%—nominally, 12%—and the quantity of milk powder which is added to the liquid milk is typically 24% by weight of the total weight of the mixture, so that the milk solids content of the mixture, when made, is 35.5% to 36.5%—nominally, 36%—by weight thereof.

A further step that may be employed during the manufacturing of the condensed milk in keeping with the present invention is as follows:

(e) After step (b) and before step (c), the flavor of the manufactured condensed milk maybe altered by placing the mixture in an evaporator and evaporating off from 1% to 5% by weight thereof.

Yet a further step that may be employed is as follows:

(f) After step (a), a milk-compatible sweetener may be added to the mixture.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

The use of ordinary water to reconstitute milk products of any sort is typically unsatisfactory. Even in ordinary household use, mixing milk powder with water results in a less than satisfactory mixture because the milk powder does not fully dissolve in water. The problem is that the lactose and protein milk solid constituents, in particular, do not easily or readily dissolve in water. Any attempt to heat the water to try to promote solubility results in at least partially cooking the milk powder, making it even less soluble. Needless to say, these problems are exacerbated many times over if an attempt is made to reconstitute milk using milk powder on a commercial basis.

It will be understood, of course, that if an attempt is made to replicate the milk solids constituency of condensed milk, having 36% milk solids, then the problem of attempting to reconstitute condensed milk using ordinary water is overwhelming.

Thus, other approaches have been made, as noted above, to provide reconstituted condensed milk products to the market. That means, of course, that access to supplies of milk powder, which otherwise provides efficient and inexpensive storage of milk which cannot be stored for long period of time in liquid form except with special precautions, is precluded.

However, it has occurred to the inventor herein that there is a ready and relatively inexpensive source of liquid into which milk powder will readily dissolve. That fluid is, of course, liquid milk which has been derived from dairy cattle and which is chemically exactly suited to dissolve lactose and protein milk solids as they are found in dried milk powder. In other words, the production of condensed milk having approximately 36% milk solid component which is fully dissolved in the carrier liquid, particularly in commercial quantities, can be achieved at relatively low cost and without the necessity for special machinery, storage facilities, and the like. As noted above, this is because there is a natural affinity for bovine-derived water—the water content of liquid milk as it is derived form dairy cattle—for lactose and milk protein solids, which are fully soluble therein.

Commercial dairy organizations will have, of course, access to significant supplies of raw milk. They may also have on-site storage of dried milk powder because it may sometimes occur that there is an oversupply of raw milk which cannot be brought to the market in liquid form. Dried milk powder has a significantly long shelf life, and if reconstituted it will provide at least a form of liquid milk. That reconstituted liquid milk is typically employed in the baking industry, or other food processing industries that require significant quantities of liquid milk. The reconstituted dried milk powder/ordinary water product is, however, typically not suitable for or intended for consumption as a liquid milk beverage.

On the other hand, as noted, dried milk powder is preeminently soluble in liquid milk. The liquid milk may be skimmed milk having 0% milk fat content; or it may be partially skimmed milk typically having 2% milk fat content, or it may be whole milk which typically has between 4.5% and 6% milk fat content.

In general, the principal steps which are followed in keeping with the present invention, and in its practice, have been noted above but for ease of reference are set forth below:

(a) Mixing liquid milk which has 10% to 14% milk solids and a first predetermined milk fat content with dried milk powder having a second predetermined milk fat content, in amounts so that the total weight percentage of milk solids from the liquid milk and the dried milk powder is 32% to 40% by weight of the mixture.

(b) Permitting the mixture of step (a) to stand for at least 30 minutes.

(c) Pasteurizing the mixture after the conclusion of step (b).

(d) Recovering the pasteurized mixture for further packaging and handling.

In general, the liquid milk which is employed in the practice of the present invention is raw milk, but typically if raw milk cannot be processed in a very short period of time then it will have been pasteurized. However, the liquid milk will not have been subjected to any other treatment, and in particular it will not have been homogenized or mechanically processed. Moreover, because of the relatively short shelf life or storage life of liquid milk, whether raw or pasteurized, it is typical that the milk shall have been stored at a temperature of from about 2° C. to about 25° C. Preferably, the milk storage will have been at a temperature below about 10° C.

Thus, step (a) is one which is typically carried out in the temperature ranges indicated above, and preferably below about 10° C. By storing the liquid milk, and carrying out steps (a) and (b) at low temperatures, then the likelihood of the development of bacterial growth is inhibited, if not pecluded.

Step (b) permits the lactose and protein constituents of the dried milk powder to fully dissolve into the liquid milk.

Nonetheless, that process takes at least 30 minutes, and typically takes from 45 minutes to about 3 hours. At the conclusion of that step, however, it will be understood that the milk solution that has been derived is one which is very high in milk solids content, so much so that it will have a milk solids analysis similar to that of condensed milk.

Of course, the mixture is then typically pasteurized in keeping with the provisions of step (c); and then in keeping with the provisions of step (d), the pasteurized mixture will be recovered for further packaging and handling.

It will be understood that commercial practice of the present invention will be such that many thousands of litres of liquid milk, and many hundreds of kilograms of dried milk powder, will be employed in a single batch as it is mixed in keeping with the provisions of step (a).

During step (b), it may be necessary, as will be understood by those skilled in the art, to occasionally stir the mixture while it is standing so as to permit the lactose and protein constituents to be fully dissolved into the liquid milk.

It will also be understood, of course, that a typical batch to produce a mixture having the same analysis as condensed milk may therefore be made from liquid milk which has a milk solids content of from about 11.5% to about 12.5% by weight, mixed with milk powder whose weight is 24% of the total weight of the mixture, to arrive at a mixture having a milk solids content of 35.5% to 36.5% by weight of the mixture—in other words, nominally a condensed milk having about 36% milk solids content.

It may sometimes be required that the flavor of the condensed milk which is manufactured in keeping with the present invention shall be slightly altered so as to have the typical caramelized flavor overtones that are present with conventional condensed milk as it is presently available in the market. To that end, the mixture that is available after the completion of step (b) may then be introduced into an evaporator and moisture in an amount of from 1% to about 5% by weight of the mixture may be evaporated off. If so, then typically the amount of dried milk powder that is employed in step (a) might be slightly less than would otherwise be employed due to the additional loss of moisture from the liquid mixture as it then exists just prior to the evaporating step.

It may also be desirable on some occasions to provide a sweetened condensed milk in keeping with the present invention; and if so, a milk-compatible sweetener will be added to the mixture after step (a) is concluded and at the beginning of step (b).

There has been described a method of manufacturing a liquid milk product which has the same analysis as condensed milk, insofar as the percentage of milk solids in the liquid product is concerned. Accordingly, the product which is produced in keeping with present invention is, itself, condensed milk, even though it has not been subjected to the normal evaporation or condensation process that has been heretofore employed. Moreover, the manufactured condensed milk in keeping with present invention is such that it comprises only naturally occurring milk components, except possibly for milk-compatible sweeteners in some circumstances. In any event, the present invention provides a method for the manufacture of condensed milk which employs a liquid into which milk solids in the form of dried milk powder will be fully soluble, since that liquid has been derived from the same source as the dried milk powder, namely from dairy cattle.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A method of manufacturing condensed milk having a milk solids component of 32% to 40% by weight thereof, and having a predetermined milk fat content, comprising the steps of: (a) mixing liquid milk having 10% to 14% milk solids and a first predetermined milk fat content with dried milk powder having a second predetermined milk fat content, at a temperature of 2° C. to 25° C., in amounts so that the total weight percentage of milk solids from said liquid milk and said dried milk powder is 32% to 40% by weight of the mixture; (b) permitting the mixture of step (a) to stand for at least 30 minutes at a temperature of 2° C. to 25° C.; (c) pasteurizing the mixture after the conclusion of step (b); and (d) recovering the pasteurized mixture for further packaging and handling.

2. The method of claim 1, wherein said liquid milk is chosen from the group consisting of raw milk, pasteurized milk, and mixtures thereof.

3. The method of claim 2, wherein prior to step (a). said liquid milk has been stored at a temperature of 2° C. to 25° C.

4. The method of claim 2, wherein prior to step (a). said liquid milk has been stored at a temperature of 2° C. to 10° C., and steps (a) and (b) are carried out at a temperature of 2° C. to 10° C.

5. The method of claim 1, wherein the duration of step (b) is from 45 minutes to 3 hours.

6. The method of claim 1, wherein during step (b), said mixture is stirred occasionally.

7. The method of claim 1, wherein said mixture is produced from a liquid milk having a milk fat content of from 0 to 6% by weight, and wherein said milk powder has been derived from liquid milk having a milk fat content of from 0 to 6% by weight.

8. The method of claim 7, wherein the milk fat content of said mixture is chosen from the group consisting of 0%, 2%, and the range of 4.5% to 6%.

9. The method of claim 1, wherein said liquid milk has a milk solids content of 11.5% to 12.5%, and the quantity of said milk powder added thereto is 24% by weight of the total weight of said mixture, whereby the milk solids content of said mixture is 35.5% to 36.5% by weight thereof.

10. The method of claim 1, wherein after step (b) and before step (c), the flavor of said manufactured condensed milk is altered by placing said mixture in an evaporator and evaporating off from 1% to 5% by weight thereof.

11. The method of claim 1, wherein after step (a), a milk-compatible sweetener is added to said mixture.

* * * * *